United States Patent [19]
Kano

[11] Patent Number: 6,147,832
[45] Date of Patent: Nov. 14, 2000

[54] FLOPPY DISK DRIVE WITH PWM CONTROL

[75] Inventor: Ikuo Kano, Hanamaki, Japan

[73] Assignee: Matsushita Electric Industial Co., Ltd., Osaka, Japan

[21] Appl. No.: 08/305,076

[22] Filed: Sep. 13, 1994

[30] Foreign Application Priority Data

Sep. 29, 1993 [JP] Japan .................................. 5-242455

[51] Int. Cl.$^7$ .................................................. G11B 5/596
[52] U.S. Cl. .......................................... 360/78.13; 360/69
[58] Field of Search .................................. 318/685, 696, 318/812; 360/78.04, 78.13

[56] References Cited

U.S. PATENT DOCUMENTS

| | | | |
|---|---|---|---|
| 4,600,868 | 7/1986 | Bryant | 318/567 |
| 4,691,153 | 9/1987 | Nishimura | 318/696 |
| 5,084,661 | 1/1992 | Tanaka | 318/685 |
| 5,117,171 | 5/1992 | Bonss | 318/685 X |
| 5,402,052 | 3/1995 | Cheng et al. | 318/685 X |
| 5,485,070 | 1/1996 | Tominaga | 318/696 |

FOREIGN PATENT DOCUMENTS

| | | |
|---|---|---|
| 63-17598 U | 2/1988 | Japan . |
| 4133695 | 5/1992 | Japan . |
| 520814 | 1/1993 | Japan . |

OTHER PUBLICATIONS

Principles of Power Electronics, Kassakian et al., 1991, pp. 182–186.

*Primary Examiner*—Paul Loomis
*Assistant Examiner*—K. Wong
*Attorney, Agent, or Firm*—Stevens, Davis, Miller & Mosher, L.L.P.

[57] ABSTRACT

A floppy disk drive has an exciting current supplying circuit and a control circuit for controlling the exciting current supplying circuit so that the exciting current is increased to a first predetermined value, reduced to a second predetermined value and then decreased to zero or raised to a third predetermined value. This arrangement has the effect of suppressing the counter electromotive force induced by the self induction of the motor coil, reducing noises on a power line and thereby preventing irregular rotation of the stepping motor.

9 Claims, 5 Drawing Sheets

FLOPPY DISK DRIVE WITH PWM CONTROL

BACKGROUND OF THE INVENTION

1. Field of the Invention

The present invention relates to a floppy disk drive which operates to travel a head carriage for magnetical recording of data in the radial direction of a magnetic disk by driving a stepping motor.

2. Description of the Related Art

This type of floppy disk drive (FDD) has been conventionally arranged to have a stepping motor, a head carriage for magnetically recording data, and a magnetic disk on which data is recorded. In operation, the stepping motor is actuated by exciting current to rotate with the controlled rotating angles so that the head carriage is allowed to travel by a predetermined distance in the radial direction of the magnetic disk.

The exciting current flows through the stepping motor for a fixed interval of time, e.g. 10 to 18 ms, after the motor receives a step signal corresponding to a FDD interface signal.

When the step signal is input, an exciting current enable signal having a constant time duration is generated, then the exciting current is allowed to flow through motor coils of the stepping motor for the above constant time duration so that the stepping motor may travel forward. When the stepping motor finishes a one-step travel, the exciting current is cut off.

If the exciting current is not large, the stepping motor moves too slowly. Hence, the current to be applied to the motor is selected larger than a certain magnitude. However, the continuous application of such large current causes a large overshoot of the stepping motor travel, which requires a considerably long time until the stepping motor is settled in a right place. To overcome this shortcoming, in general, the exciting current is temporarily cut off after a proper time is passed for the purpose of checking the action of the stepping motor and suppressing the overshooting travel of the motor from the desired location.

This type of stepping motor derives damped oscillation at application of the exciting current. The motor vibrates for a certain length of time until it is relocated to a right place. This vibration may result in bringing about noisy sounds in the stepping motor and the head carriage.

Moreover, when the exciting current is cut off, counter electromotive force is induced by the motor coil itself, so that the current is kept flowing in the coil and flows backward the power supply unit. This inverse current brings about noises in a power line which may intrude to a control circuit of the stepping motor control circuit in which those noises may rotate the stepping motor irregularly.

To suppress such ripples caused in the stepping motor, Imagawa teaches in JPA-4-133695 a control method of a stepping motor for suppressing the vibrations caused in a low-speed drive and enabling the smooth motion of the stepping motor by suppressing a driving voltage of the stepping motor according to reduction of frequency of input pulses.

Further, with regard to the current of the stepping motor, Tsuyuguchi teaches in JPA-5-20814 a control method of a stepping motor for stabilizing the current of the stepping motor by performing a PWM control during a seek period to change a duty ratio or a frequency so as to compensate a current variation in the windings resulting from variation of the supply voltage.

However, these methods require additional circuits.

By substantially reducing the exciting current applied while the damped oscillation takes place, the damped oscillation is suppressed and the time is reduced until the stepping motor is settled in the right spot. For example, a method of chopping a supply voltage for a predetermined duration after the stepping motor returns to a target location and applying the chopped voltage to the motor coil is commonly known. This method damps the damped oscillation and thereby reduces the noises.

This method, however, brings about noises by the self induction of the motor coils when the exciting current is cut off, which cause noises in the power line. These noises may be applied to the control circuit of the stepping motor, and induce irregular rotation of the stepping motor.

Sakurai has given in JPU-63-17598 a teaching of how to suppress the noises generated in the power line. Sakurai's method includes switching transistors at finish of seek so that the inverse current caused by self induction of the motor coils flows through additional resistors connected to the power supply unit of the stepping motor. This reduces reflux of the current to the power supply, thereby suppressing the noises generated in the power line.

The method given by Sakurai, however, needs additional circuits having resistors and transistors.

SUMMARY OF THE INVENTION

The present invention is arranged to solve the foregoing problems of the prior art. It is an object of the present invention to provide a floppy disk drive which is capable of suppressing voltage of a counter electromotive force generated by self induction of an internal coil of a stepping motor, reducing the noises generated in a power line, and thereby preventing irregular rotation of the stepping motor.

To attain the object, according to an aspect of the invention, a floppy disk drive includes means for flowing exciting current through a stepping motor to move a head carriage for magnetically recording data by rotating the stepping motor with controlled rotating angles of the stepping motor and PWM control means for reducing the exciting current prior to cut-off of the exciting current of the stepping motor.

To attain the object, according to another aspect of the invention, a floppy disk drive includes means for performing PWM control so that the exciting current is lowered immediately before the exciting current of the stepping motor is switched.

To attain the object, according to a further aspect of the invention, a floppy disk drive includes means for performing PWM control so that the exciting current is flown for a certain time after receiving a step signal and then the exciting current is lowered within the exciting time of the stepping motor.

Further, the floppy disk drive according to this invention is characterized in that a transistor provided at one end of a motor coil is connected to the ground while the above PWM control is in execution.

DESCRIPTION OF THE PREFERRED EMBODIMENTS

FIGS. 1 to 4 are used for explaining a method for driving a head carriage in the conventional floppy disk drive.

Figure 1:
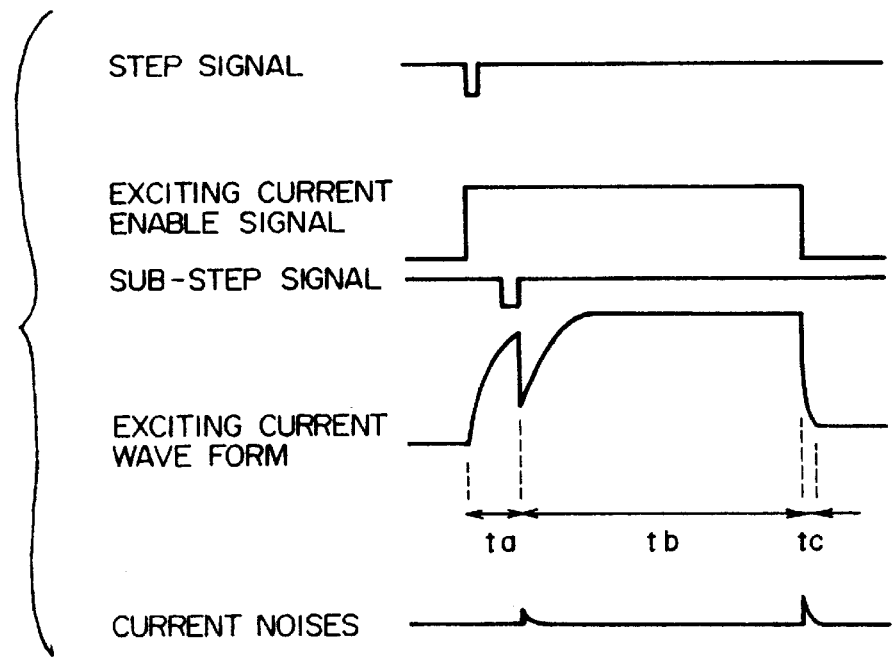
FIG. 1 is a timing chart showing exciting current after a step signal is received in the conventional floppy disk drive.

FIG. 1 shows a typical example of a waveform of exciting current for a motor coil. The motor coil operates to drive a stepping motor for traveling a head carriage. When a step signal is input to a drive of the stepping motor, an exciting current enable signal is generated and held for a fixed time duration. While the enable signal is being held, the exciting current keeps flowing through the coil. To prevent an excessive overshooting travel of the head carriage over a target location, after a certain time is passed after the input of the step signal, a sub-step signal is additionally generated for moving the carriage by one track in combination with the step signal. In FIG. 1, reference ta denotes an exciting current time between the receiving of the step signal and the generating of the sub-step signal inside of the FDD. Reference tb denotes a time from the sub-step time to the time when the exciting current is cut off after the stepping motor is stopped. Reference tc denotes a duration of current flowing from the ground to the power supply due to a counter electromotive force generated by self induction of the coil inside of the stepping motor. When the exciting phase is switched or the exciting current is cut off, the noises are generated in the power supply.

Figure 2:
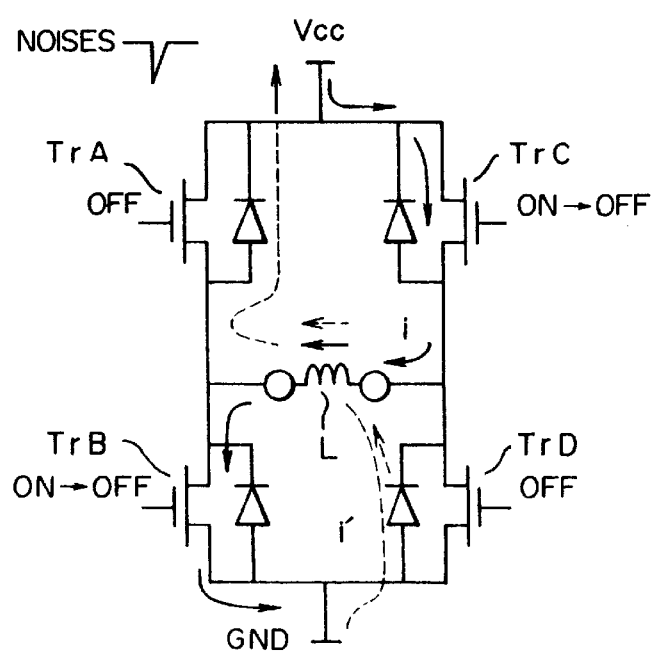
FIG. 2 is a circuit diagram of the conventional floppy disk drive showing exciting current of a stepping motor.

FIG. 2 shows routes of current noises generated in a circuit for feeding exciting current to the stepping motor. The circuit for feeding exciting current is arranged to have a pair of transistors TrA and TrB, another pair of transistors TrC and TrD, the transistors in each pair being series-connected, these two pairs of transistors being connected in parallel between a power supply Vcc and the ground GND, and a motor coil L connected between a connection point of the transistors TrA and TrB and a connection point of the transistors TrC and TrD. Further, each transistor has a diode connected in parallel for preventing breakdown of the transistor by a spike noise caused in the circuit. The transistor is driven by the control unit (not shown) so that the necessary exciting current is flown through the motor coil.

In FIG. 2, as mentioned above, the exciting current of the stepping motor flows from the power supply Vcc to the ground GND through the transistor TrA, the coil L and the transistor TrD. When the current flows through the coil in the reverse direction, the current flows from the power supply Vcc to the ground GND through the transistor TrC, the coil L and the transistor TrB. In the foregoing prior art, when the transistors TrC and TrB are switched on, the current flows through the route indicated by solid lines of i. Then, when the transistors are switched off, the current flows through a route i' indicated by broken lines in FIG. 2, that is, from the ground GND to the power supply through the diodes connected to the transistors TrA and TrD. This is because the coil L has a self-inducing function of maintaining flow of the current. This current flown through the route i' will induce noises in the power supply unit. The exciting current of the stepping motor is saturated to the maximum value after a certain time based on a time constant of an inductance component of the coil located inside of the motor. Also, the torque of the stepping motor is made maximum because it is proportional to the exciting current. In light of this matter, since the exciting current is made maximum when the exciting current is cut off, the noise current generated in the motor coil is also made maximum at that time.

When the exciting phase of the stepping motor is switched, the current is changed to flow reversely in the motor coil. Of course, the counter electromotive force generated by the self induction of the motor coil brings about the similar noises.

This kind of noise current is flown back to the power supply unit and is overlapped in the supplied power to other circuits in the FDD. This results in degrading reliability of the FDD.

Figure 3:
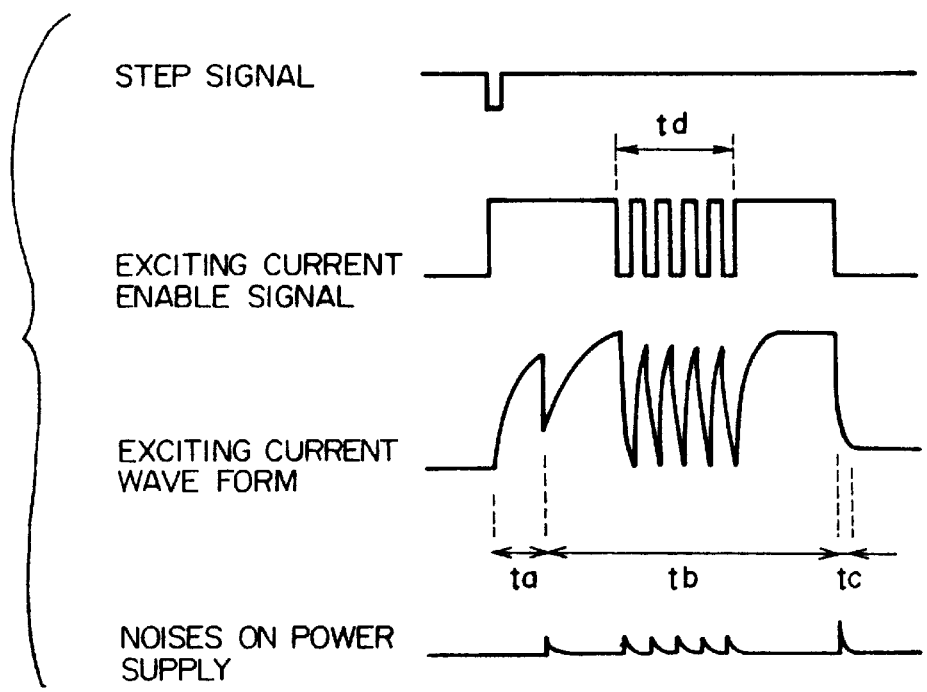
FIG. 3 is a timing chart showing reduction timing of exciting current by the chopping operation of the conventional floppy disk drive.
Figure 4:
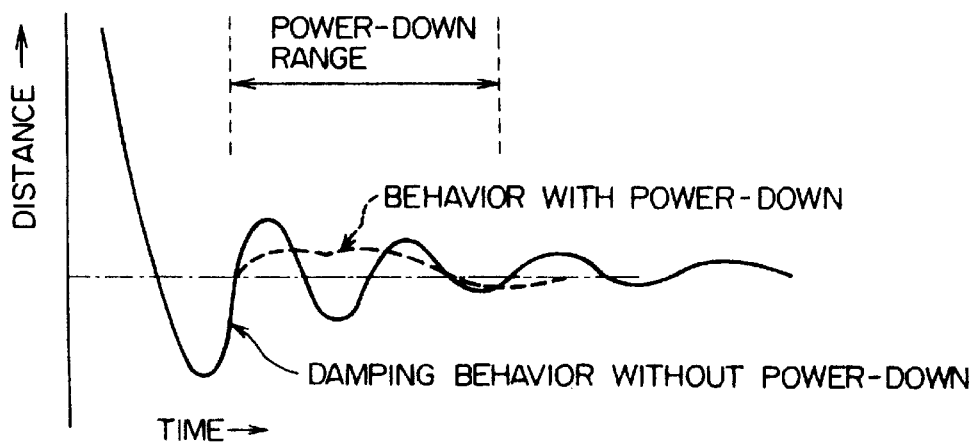
FIG. 4 is an explanatory view showing a behavior of a stepping motor and a head carriage included in the conventional floppy disk drive.

FIG. 3 shows the timings on which the exciting current is reduced by chopping. FIG. 4 shows behaviors of the stepping motor and the head carriage when the exciting current is reduced.

The behavior of the stepping motor brought about when the maximum exciting current is continuously flowing through the motor as shown in FIG. 1 indicates a damped oscillation characteristic shown by a solid line of FIG. 4. When the step signal is additionally applied to the FDD while keeping the damped oscillation, the stepping motor and the head carriage operate to vibrate so that noises are generated therein. Then, if the exciting current is reduced at the time td as shown in FIG. 3 while the damped oscillation occurs, the damped oscillation is made lowered as shown by a broken line in FIG. 4. This makes it possible to reduce the noises. The above chopping method, however, operates to repeat turning on and off of the exciting current. This results in causing noises to take place in the coils of the stepping motor, thereby deriving noises in the power supply.

In the conventional FDD, as described above, when the exciting current of the stepping motor is cut off, when the current is reduced to a certain level by chopping, or when the exciting phase of the current is switched, the current is flown from the ground to the power supply unit through the motor coil by the effect of the counter electromotive force generated by self induction of the motor coil. This results in generating the noises in the power line. These noises are applied to the control circuit of the stepping motor, which may induce the irregular rotation of the stepping motor.

Figure 5:
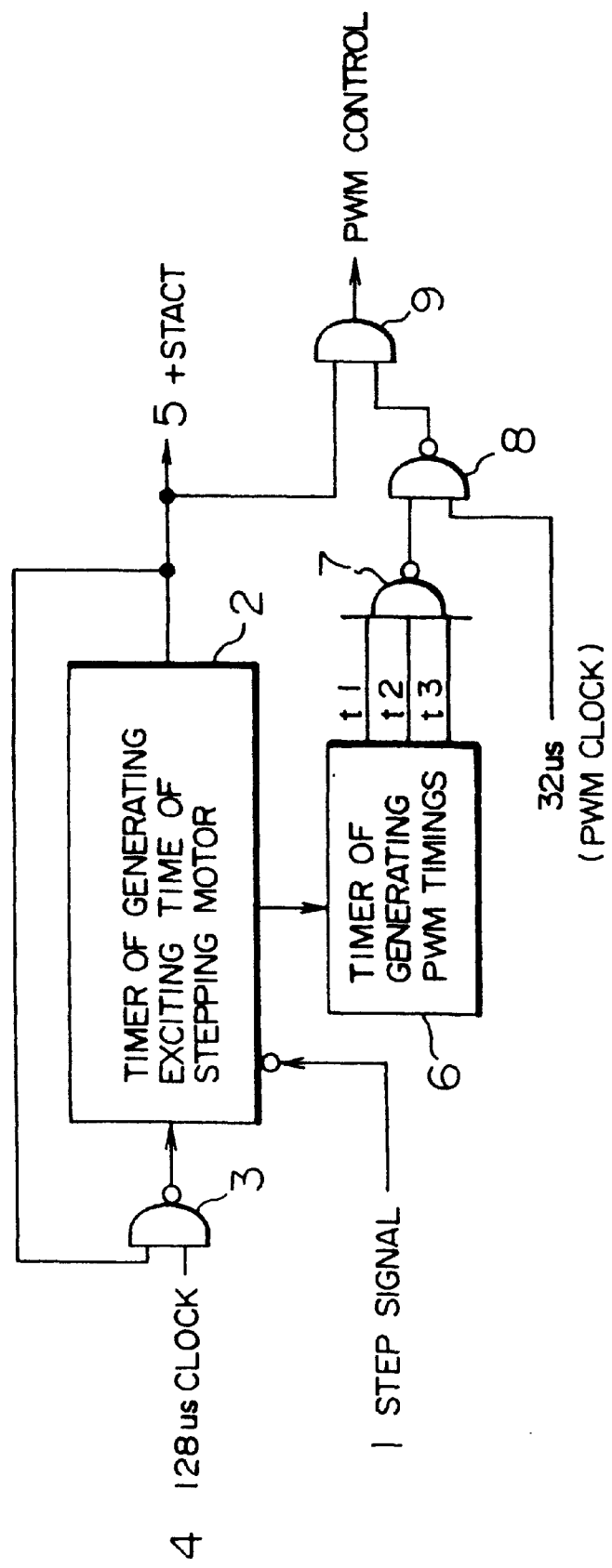
FIG. 5 is a block diagram showing an important part of a floppy disk drive according to an embodiment of the present invention.
Figure 6:
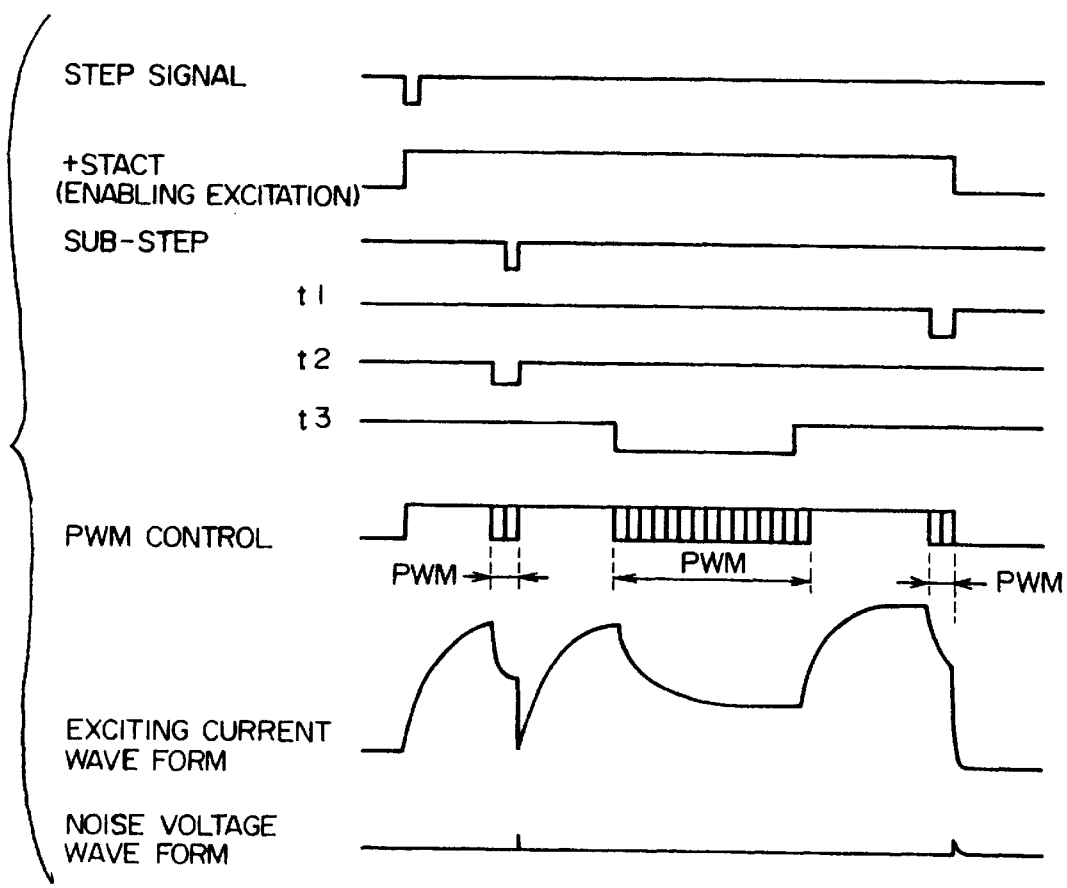
FIG. 6 is a timing chart showing the floppy disk drive according to the embodiment.

FIG. 5 is a block diagram showing part of a floppy disk drive (FDD) according to an embodiment of the invention. FIG. 6 is an explanatory timing chart showing the operation of the floppy disk drive shown in FIG. 5.

As shown in FIG. 5, a timer 2 for generating an exciting enable signal of the stepping motor is triggered by a step signal 1 which is one of FDD interface signals. This timer 2 includes a circuit for starting a count of pulses of 128 μs from a clock 4 input through an AND element 3 at resetting a counter served as a timer in response to the step signal 1 and stopping the counter when the counter is counted up. The count-up value of the timer 2 is set as about 10 to 18 ms after the input of the step signal 1. The timer 2 creates the exciting enable signal 5 (+STACT) to enable the stepping motor active within the above set time value. When the step signals 1 are successively input to the stepping motor drive, the counter is reset again before it is counted up. Hence, the exciting enable signal indicates an enable state until count-up of the counter after reception of the final step signal 1.

By using the count information of the timer 2, a PWM timing generating circuit 6 provides PWM timing signals t1, t2, t3 through NAND circuits 7 and 8 and AND circuit 9. Reference t1 denotes a PWM timing on which PWM control is done immediately before the exciting current is cut off. In this embodiment, the period is set as 512 $\mu$s. Reference t2 denotes another PWM timing immediately before the exciting phase is switched in response to a sub-step signal created inside of the FDD. In this embodiment, the period is set at a value from 32 to 512 $\mu$s. Further, reference t3 denotes the other PWM timing on which the exciting current is reduced for suppressing the vibrating noises generated by the stepping motor. The start time of the PWM is set at a value from 3 to 4.5 ms after reception of the step signal. The end time is set at a value from 8 to 14 ms. In each PWM timing period, the exciting current of the stepping motor is PWM-controlled. The clock for the PWM control is preferably set to have a period of 4 to 64 $\mu$s.

Figure 7A:
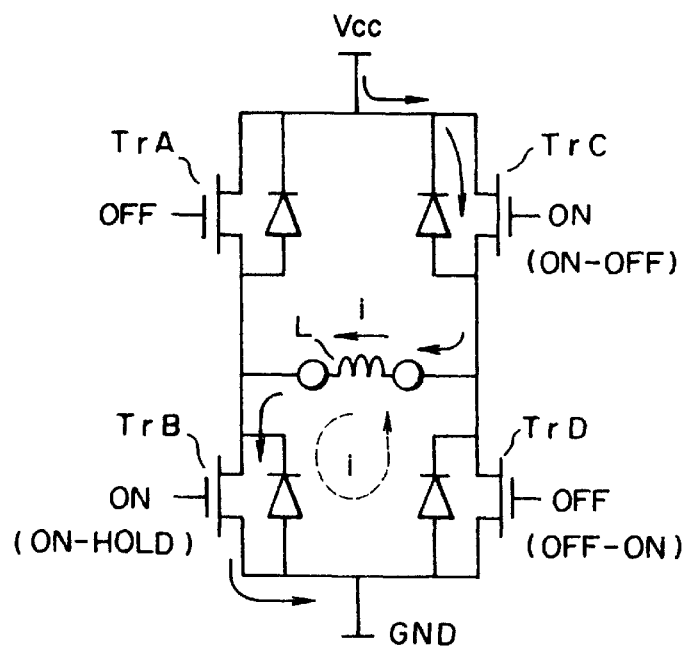
FIG. 7A is a circuit diagram showing exciting current of a stepping motor of the floppy disk drive of the invention.
Figure 7B:
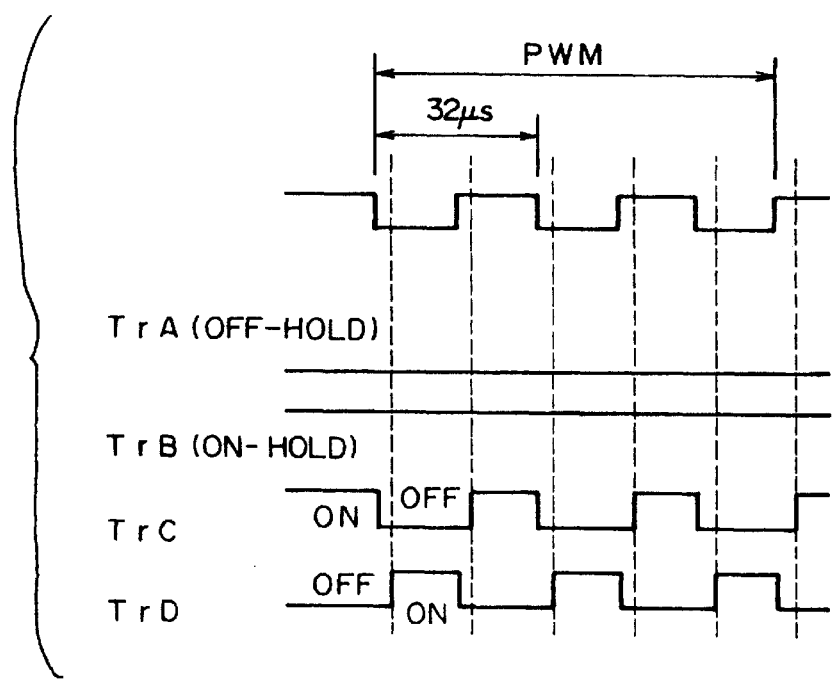
FIG. 7B is a chart showing a PWM operation of exciting current of the stepping motor included in the floppy disk drive.

The operation of the foregoing arrangement will be described with reference to FIG. 6 for explaining the timing and FIGS. 7A and 7B for explaining the PWM operation. FIG. 6 shows a step signal and an enabling excitation signal +STACT which is maintained for a time interval beginning with the application of the step signal. The second to last graph of FIG. 6 shows the exciting current wave form just before, during and just after this time interval. The exciting current wave form is shown as being cut off at a termination of the time interval and as being restored during the time interval.

According to the present invention, the PWM control is executed when the exciting current is cut off. This is for eliminating the route i' through which the current to become noise flows backward to the power supply Vcc.

At first, after the transistor TrC on the side of the power supply unit Vcc is switched off, the transistor TrD is switched on as the transistor TrB is kept on. Then, the transistor TrC is switched on as the transistor TrB is kept on. That is, while keeping the transistor TrB on, turning on and off of the transistors TrD and TrC are alternately repeated. As a result, on the current passage of the motor coil, the reflux of the noise current to the power supply unit Vcc is inhibited, because the transistors TrB and TrD operate to flow the current to the ground.

Moreover, if the transistor TrB is kept on as mentioned above and a duty ratio provided when the on and off operation of the transistors TrD and TrC are alternately repeated is set at 50%, about 50% of the full exciting current is kept to be flown to the motor. When the exciting current of the motor is cut off after the exciting current of the motor coil is reduced based on this PWM control, the absolute value of the current flowing in the motor coil before cut-off is made smaller. This makes it possible to reduce the noises to be adversely effected on the power supply. As described above, to suppress the noises on the power supply, the exciting current of the motor coil is gradually reduced through the effect of the PWM control before cutting off the exciting current of the motor.

Further, the noise current also takes place when the exciting phase of the stepping motor is switched or each time the exciting current is chopped. On each timing when the noise current takes place, likewise, the PWM control operation can suppress the noises on the power supply.

As set forth above, the embodiment of the present invention is arranged to reduce the exciting current of the coil located inside of the stepping motor through the effect of the PWM control and then cut off the exciting current, switch the exciting phase or keep the exciting current constant, for the purpose of suppressing the counter electromotive force generated by the self induction of the coil located inside of the stepping motor. This results in reducing the noises appearing in the power line. Therefore, the stepping motor is prevented from irregular rotation.

Moreover, during the PWM control period, the noise current is flown to the ground in the circuit arrangement that one end of the coil is connected to a grounded transistor. This prevents the reflux of the noise current generated in the coil to the power supply, thereby more positively protecting the power supply unit.

What is claimed is:

1. A floppy disk drive apparatus comprising
    a head carriage for carrying a head for magnetically recording data on a floppy disk;
    stepping motor for moving said head carriage in a radial direction with respect to said floppy disk;
    an exciting current supplying circuit for supplying an exciting current to said stepping motor to cause said stepping motor to rotate by a predetermined rotation angle in accordance with a step signal applied to said exciting current supplying circuit; and
    a control circuit for controlling said exciting current supplying circuit, to supply the exciting current to said stepping motor, said control circuit including means for providing an enabling excitation signal during an enabling excitation time interval beginning from application of said step signal and ending at a trailing edge of a timing pulse which is for identifying a period prior to cut off of the enabling excitation signal, wherein said control circuit controls said exciting current supplying circuit: (i) to increase the exciting current to a first predetermined value during a first exciting time period of said enabling excitation time interval prior to an occurrence of a leading edge of said timing pulse, (ii) to reduce the exciting current from the first predetermined value to a second non-zero predetermined value during a second exciting time period of said enabling excitation time interval beginning near an end of said first exciting time period corresponding to said leading edge of the timing pulse; and (iii) to cut off the exciting current in response to cut off of the enabling excitation signal near an end of said second exciting time period corresponding to the trailing edge of the timing pulse, wherein the exciting current is subsequently reduced to zero from the second non-zero predetermined value.

2. A floppy disk drive as claimed in claim 1, wherein said control circuit comprises means for applying a pulse width modulation control signal to said exciting current supplying circuit during said second exciting time period.

3. A floppy disk drive as claimed in claim 2, wherein said exciting current supplying circuit comprises:
    a first transistor and a second transistor in series; and
    means for turning said first transistor alternately ON and OFF, and for turning said second transistor alternately OFF and ON, in accordance with said pulse width modulation control signal.

4. A floppy disk drive apparatus comprising:
    a head carriage for carrying a head for magnetically recording data on a floppy disk;
    a stepping motor for moving said head carriage in a radial direction with respect to said floppy disk;

an exciting current supplying circuit for supplying an exciting current to said stepping motor to cause said stepping motor to rotate by a predetermined rotation angle in accordance with a step signal applied to said exciting current supplying circuit; and a control circuit for controlling said exciting current supplying circuit, when the exciting current of said stepping motor is restored during an enable excitation time interval beginning from application of said step signal, (i) to increase the exciting current to a first predetermined value during a first exciting time period, (ii) subsequently to reduce the exciting current to a second predetermined value during a second exciting time period and (iii) further to decrease the exciting current to zero during a third exciting time period.

5. A floppy disk drive as claimed in claim 4, wherein said control circuit comprises means for applying a pulse width modulation control signal to said exciting current supplying circuit during said second exciting time period.

6. A floppy disk drive as claimed in claim 5, wherein said exciting current supplying circuit comprises:

a first transistor and a second transistor in series; and means for turning said first transistor alternately ON and OFF, and for turning said second transistor alternately OFF and ON, in accordance with said pulse width modulation control signal.

7. A floppy disk drive apparatus comprising:

a head carriage carrying a head for magnetically recording data on a floppy disk;

a stepping motor for moving said head carriage in a radial direction with respect to said floppy disk;

an exciting current supplying circuit for supplying an exciting current to said stepping motor to cause said stepping motor to rotate by a predetermined rotation angle in accordance with a step signal applied to said exciting current supplying circuit; and a control circuit for controlling said exciting current supplying circuit to supply exciting current to said stepping motor, when the exciting current is applied to said stepping motor during an enabling excitation time interval beginning from application of said step signal, wherein said control circuit controls said exciting current supplying circuit (i) to increase the exciting current to a first predetermined value during a first exciting time period which occurs during said enabling excitation time interval and which begins lust after an occurrence of a sub-step signal and ends prior to an occurrence of a leading edge of a timing control signal for reducing the exciting current, (ii) to reduce the exciting current to a second non-zero predetermined value during a second exciting time period which occurs during said enabling excitation time interval and which begins near an end of said first exciting time period and ends near an occurrence of a trailing edge of the timing control signal; and (iii) to increase the exciting current to a third predetermined value during a third exciting time period which occurs during said enabling excitation time interval and which begins near an end of said second exciting time period and ends after occurrence of the trailing edge of the timing control signal.

8. A floppy disk drive as claimed in claim 7, wherein said control circuit comprises means for applying a pulse width modulation control signal to said exciting current supplying circuit during said second exciting time period.

9. A floppy disk drive as claimed in claim 8, wherein said exciting current supplying circuit comprises:

a first transistor and a second transistor in series; and means for turning said first transistor alternately ON and OFF, and for turning said second transistor alternately OFF and ON, in accordance with said pulse width modulation control signal.

* * * * *